US009250472B2

(12) United States Patent
Ohkubo et al.

(10) Patent No.: US 9,250,472 B2
(45) Date of Patent: Feb. 2, 2016

(54) LIQUID CRYSTAL DISPLAY DEVICE (71) Applicant: Japan Display Inc., Tokyo (JP)

(72) Inventors: Masahiro Ohkubo, Tokyo (JP); Yuichi Inoue, Tokyo (JP); Kenichi Hatakeyama, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 14/296,804

(22) Filed: Jun. 5, 2014

(65) Prior Publication Data
US 2014/0362327 A1 Dec. 11, 2014

(30) Foreign Application Priority Data

Jun. 7, 2013 (JP) .................... 2013-120947

(51) Int. Cl.
*G02F 1/1333* (2006.01)
*G02F 1/1335* (2006.01)
*G02F 1/1345* (2006.01)

(52) U.S. Cl.
CPC ...... *G02F 1/133615* (2013.01); *G02F 1/13452* (2013.01); *G02F 1/133308* (2013.01); *G02F 1/133608* (2013.01); *G02F 2001/133612* (2013.01)

(58) Field of Classification Search
CPC ............... G02F 1/133308; G02F 1/133608; G02F 1/13452; G02F 2001/133334
USPC .............................. 349/58, 59, 150
See application file for complete search history.

(56) References Cited

U.S. PATENT DOCUMENTS 8,497,951 B2* 7/2013 Kobayashi ............ 349/58
2008/0303972 A1* 12/2008 Han et al. ............ 349/58
2009/0225253 A1 9/2009 Oohira

FOREIGN PATENT DOCUMENTS

JP 2008-203445 A 9/2008
JP 2009-216753 A 9/2009

* cited by examiner

Primary Examiner — Thanh-Nhan P Nguyen
(74) Attorney, Agent, or Firm — Lowe Hauptman & Ham, LLP

(57) ABSTRACT

A backlight unit for a liquid crystal display device includes a light source element, a light guide plate for guiding the output light from the light source element, and a frame for housing the light guide plate. The light source element is mounted on a flexible wiring substrate fixed to the liquid crystal display panel at one end thereof, together with an electronic component. The light source element and the electronic component are attached to the frame in such a way that each of the light source element and the electronic component is placed in a housing concave portion formed on the back surface side of the frame, by bending the flexible wiring substrate. A case is fixedly attached to the flexible wiring substrate to cover the electronic component. Then, the case is fixed to the inside of the housing concave portion.

2 Claims, 8 Drawing Sheets

LIQUID CRYSTAL DISPLAY DEVICE

CLAIM OF PRIORITY

The present application claims priority from Japanese Patent Application JP 2013-120947 filed on Jun. 7, 2013, the content of which is hereby incorporated by reference into this application.

BACKGROUND

The present invention relates to a liquid crystal display device, and more particularly, to a liquid crystal display device in which a light source element and an electronic component, which are mounted on a flexible wiring substrate, are attached to a frame in such a way that each of the light source element and the electronic component is placed in a housing concave portion provided in the frame of the backlight unit.

A thinned liquid crystal display device is used as a display device for various types of portable information devices such as mobile phones, personal digital assistants (PDA), digital cameras, and multimedia players.

A conventional liquid crystal display device will be described with reference to FIGS. 1A to 4.

First, an example of the conventional liquid crystal display device will be described with reference to FIGS. 1A and 1B.

Figure 1A:
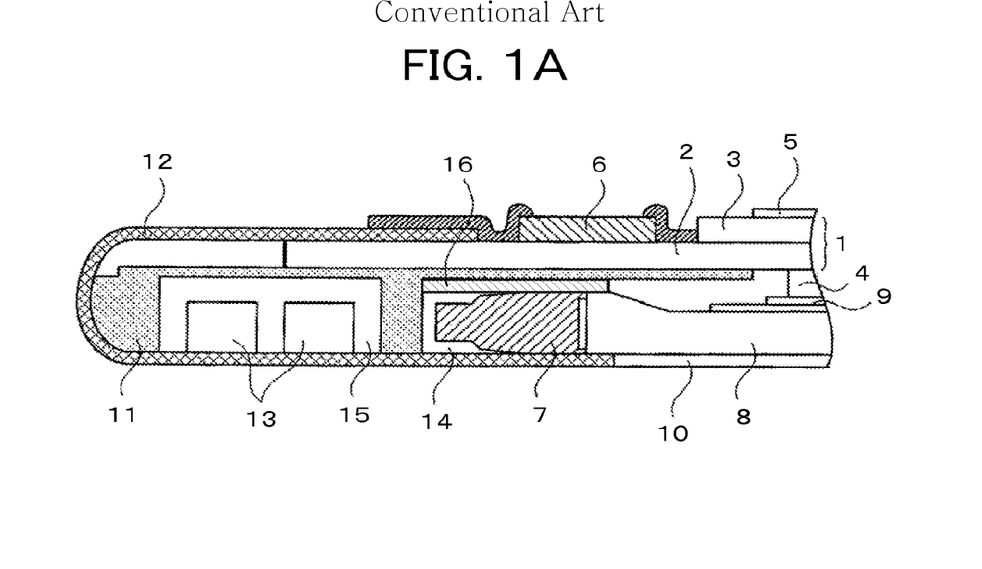
FIG. 1A is a cross-sectional side view of the liquid crystal display device and FIG. 1B is a front view seen from the left in FIG. 1A.
Figure 1B:
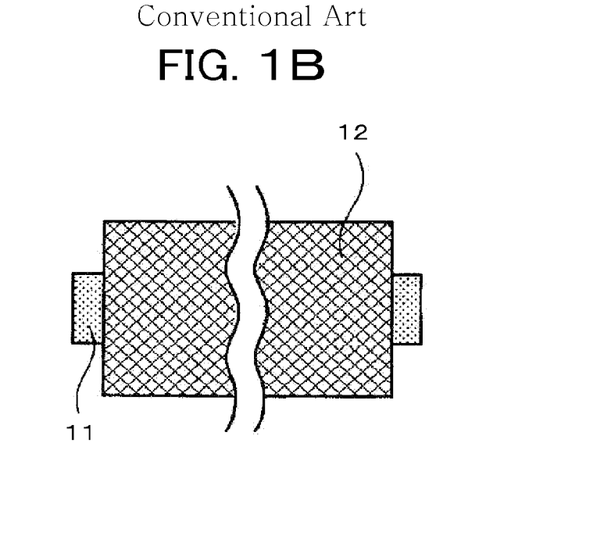

Note that FIG. 1A shows a cross section of the end portion in which a light source element of a liquid crystal display device is provided, and FIG. 1B shows the liquid crystal display device seen from the left in FIG. 1A.

The liquid crystal display device includes a liquid crystal display panel 1, and a backlight unit provided on the back surface of the liquid crystal display panel 1.

The liquid crystal display panel 1 is formed by a pair of transparent substrates 2 and 3, with the space between the transparent substrates 2 and 3 filled with liquid crystal. In the transparent substrate 2, transparent electrodes and thin film transistors are arranged to drive the liquid crystal. Then, color filters are arranged in the transparent substrate 3. Further, a lower polarizing plate 4 is provided in the transparent substrate 2, and an upper polarizing plate 5 is provided in the transparent substrate 3.

Further, an edge portion of the transparent substrate 2 extends beyond the transparent substrate 3. A driver 6 for driving the thin film transistors is mounted on the extending part.

The backlight unit includes a light emitting diode 7 as a light source element, a light guide plate 8 for guiding the light emitted from the light emitting diode 7 to the liquid crystal display panel 1 to be irradiated, an optical sheet group 9 for uniformly diffusing the light from the liquid guide plate 8 to the liquid crystal display panel 1, a reflective sheet 10 provided on the back surface of the light guide plate 8, and a frame-like frame 11 formed by a material having relatively high rigidity to accommodate the light source and the light guide plate.

One end portion of the flexible wiring substrate 12 is fixed to the transparent substrate 2 of the liquid crystal display panel. The flexible wiring substrate 12 is formed by a resin material and the like, and has flexibility. A circuit connected to the driver 6 is formed in the flexible wiring substrate 12. Further, the light emitting diode 7 and an electronic component 13 such as resistance and capacitor are mounted on the flexible wiring substrate 12.

The light emitting diode 7 and the electronic component 13 are provided on the back surface side of the flexible wiring substrate 12 in such a way that the light emitting diode 7 is located at the end portion, followed by the electronic component 13.

A first housing concave portion 14 that is open to an end surface of the liquid guide plate 8, as well as a second housing concave portion 15 are formed on the back side of the frame 11. At this time, the second housing concave portion 15 is located after the first housing concave portion 14. The light emitting diode 7 is placed in the first housing concave portion 14 so that the light emitting surface of the light emitting diode 7 faces the end surface of the light guide plate 8. Then, the electronic component 13 is placed in the second housing concave portion 15.

In other words, in the assembly operation of the liquid crystal display device, the flexible wiring substrate 12 is fixed to the liquid crystal display panel 1 in one end portion thereof and has a flat plate shape. The light emitting diode 7 and the electronic component 13 are mounted on this flexible wiring substrate 12. Then, the light emitting diode 7 and the electronic component 13 are placed in the housing concave portions 14 and 15, respectively, by bending the flexible wiring substrate 12 over one side portion of the frame 11. Then, the light emitting diode 7 is fixed to the inner surface of the housing concave portion 14 with an adhesive layer 16 such as double-sided tape.

Thus, the liquid crystal display device is assembled with the flexible wiring substrate 12 bent as shown in FIGS. 1A and 1B.

The configuration in which the light emitting diode 7 and the electronic component 13 that are mounted on the flexible wiring substrate 12 are placed in the housing concave portions 14 and 15, respectively, by bending the flexible wiring substrate 12 as described above, is a so-called full flat back in which the back surface of the liquid crystal display device is flat. Thus, there is an advantage that the configuration of the liquid crystal display device to be mounted on an actual device, such as a mobile phone, can be simplified.

Figure 2A:
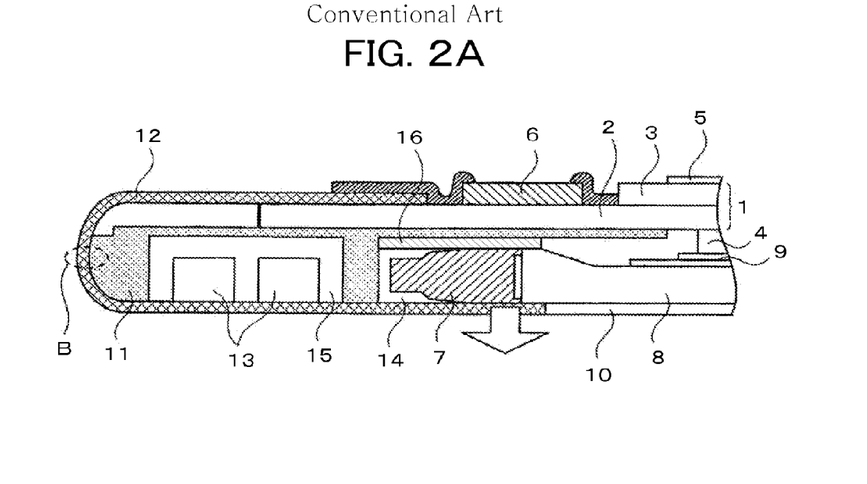
FIG. 2A is a cross-sectional side view of the liquid crystal display device and FIG. 2B is a front view seen from the left in FIG. 2A.

However, since the flexible wiring substrate 12 is bent over the side of the frame 11, a repulsive force acts on the flexible wiring substrate 12 by the internal stress in the direction in which the end portion thereof is removed and floated from the frame 11 as shown in FIG. 2A by the arrow.

Figure 2B:
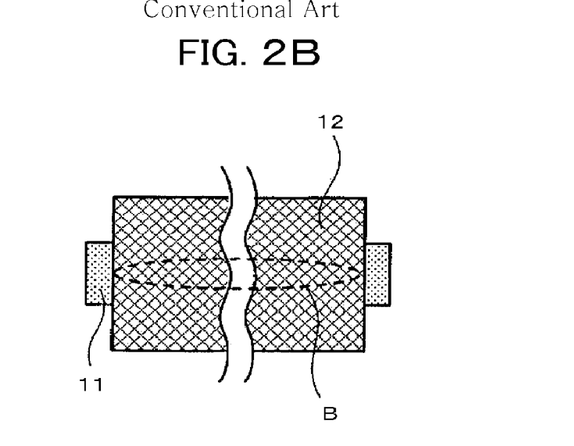

Thus, there is a problem that the mounting position of the flexible wiring substrate 12 is changed to displace the optical axis of the light emitting diode 7 to emit light to the light guide plate 8, so that the brightness of the liquid crystal display device is not as good as designed.

With the reduction in size and weight of portable information devices to be implemented, the liquid crystal display device is required to be reduced in thickness and the bending diameter of the flexible wiring substrate 12 tends to be reduced. Thus, the repulsive force on the flexible wiring substrate 12 increases, so that such a failure tends to be more obvious.

Figure 3A:
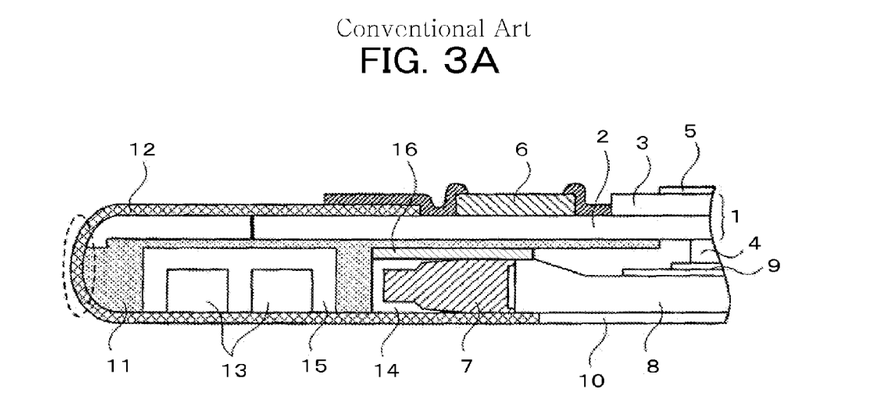
FIG. 3A is a cross-sectional side view of the liquid crystal display device and FIG. 3B is a front view seen from the left in FIG. 3A.
Figure 3B:
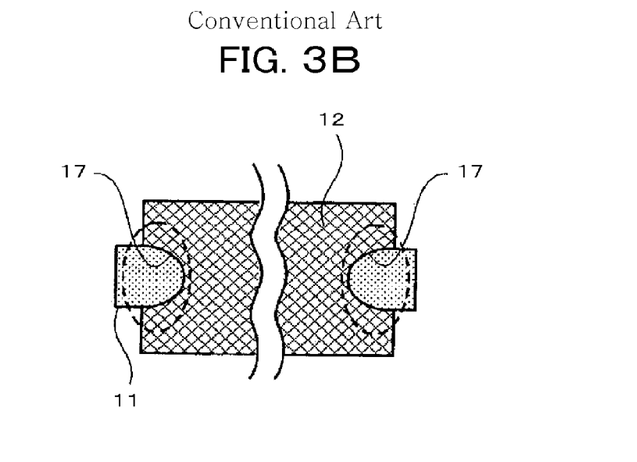

As a method for preventing this failure, as shown in FIGS. 3A and 3B, a cutout 17 is provided around the bent portion of the flexible wiring substrate 12 in order to reduce the repulsive force generated from the bent portion of the flexible wiring substrate 12.

Figure 4:
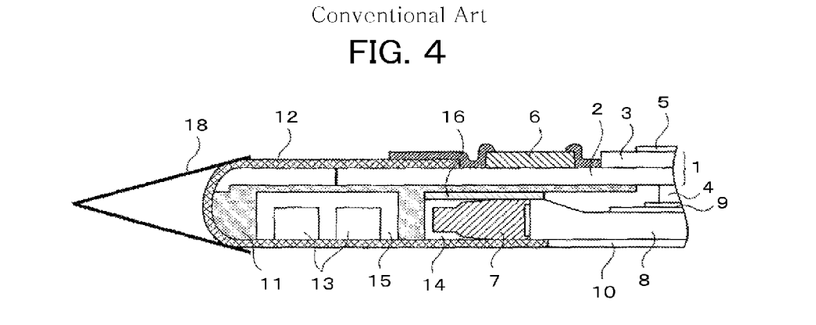
FIG. 4 is a view of a countermeasure method for the failure of the conventional liquid crystal display device, showing a cross-sectional view of the liquid crystal display device.

However, there is a limit to the area of the cutout 17 in the flexible wiring substrate 12 due to the need to ensure the area for wiring, which has made it difficult to sufficiently reduce the repulsive force. Thus, as shown in FIG. 4, a jig 18 is used in the assembly operation of the liquid crystal display device. In this method, the bent portion of the flexible wiring substrate 12 is held by the jig 18 to form a permanent bend in the flexible wiring substrate 12. However, this method may cause the line formed in the flexible wiring substrate 12 to be broken by the jig 18.

The problem is that the thickness of the liquid crystal module increases in the configuration in which the end portion of the flexible wiring substrate with the light emitting diode overlaps the reflective sheet that is provided on the back surface of the light guide plate. In order to solve this problem, Japanese Unexamined Patent Application Publication No. 2009-216753 describes an invention to reduce the length of the end portion of the flexible wiring substrate FPC to face an end surface of the reflective sheet.

Japanese Unexamined Patent Application Publication No. 2008-203445 describes an invention to form a through-hole in the bent portion of the flexible wiring substrate to reduce the repulsive force caused by the bending of the flexible wiring substrate. However, this invention has the same problem as that in the method for forming the cutout 17 as shown in FIGS. 3A and 3B.

SUMMARY

The present invention aims to rationally solve the problem and to provide a liquid crystal display device capable of stably holding a light source element placed in a housing concave portion in such a way that the light source element faces an end portion of a light guide plate.

A liquid crystal display device according to the present invention has the following technical features.

(1) A liquid crystal display device includes a liquid crystal display panel, and a backlight unit provided on a back surface of the liquid crystal display panel. The backlight unit has a light source element, a light guide plate for guiding output light from the light source element, and a frame for housing the light guide plate. The light source element is mounted on a flexible wiring substrate, together with an electronic component. One end of the flexible wiring substrate is fixed to the liquid crystal display panel. The light source element and the electronic component are attached to the frame in such a way that each of the light source element and the electronic component is placed in a housing concave portion formed on the back surface side of the frame, by bending the flexible wiring substrate. A case is fixedly attached to the flexible wiring substrate to cover the electronic component. Then, the case is fixed to the inside of the housing concave portion.

(2) In the liquid crystal display device described in (1), the case is an electromagnetic shielding case.

According to the present invention, in the liquid crystal display device in which the light source element mounted on the flexible wiring substrate is placed in the housing concave portion, it is possible to stably hold the light source element facing an end portion of the light guide plate.

BRIEF DESCRIPTION OF THE DRAWINGS

FIGS. 1A and 1B show a conventional liquid crystal display device, in which

FIGS. 2A and 2B are views showing a failure of the conventional liquid crystal display device, in which

FIGS. 3A and 3B are views showing a countermeasure method for the failure of the conventional liquid crystal display device, in which

FIGS. 6A and 6B are views of a flexible wiring substrate, in which

FIGS. 7A and 7B are views of the initial stage of the assembly of the liquid crystal display device according to an embodiment of the present invention, in which

FIGS. 8A and 8B are views of the middle stage of the assembly of the liquid crystal display device according to an embodiment of the present invention, in which FIGS. 9A and 9B are the final stage of the assembly of the liquid crystal display device according to an embodiment of the present invention, in which

DETAILED DESCRIPTION

A liquid crystal display device according to the present invention will be described in detail with reference to a preferred embodiment.

Figure 5:
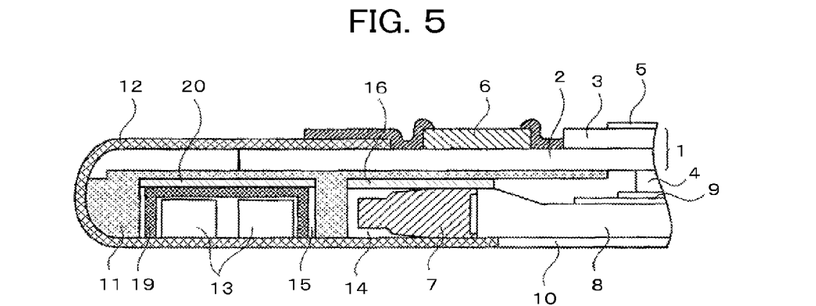
FIG. 5 is a view of a liquid crystal display device according to an embodiment of the present invention, showing a cross-sectional view of the liquid crystal display device.

A liquid crystal display device according to an embodiment of the present invention, shown in FIG. 5, includes a liquid crystal display panel 1 and a backlight unit provided on the back surface of the liquid crystal display panel 1. The backlight unit includes a light source element 7, a light guide plate 8 for guiding the output light from the light source element 7, and a frame 11 for housing the light guide plate 8. The light source element 7 is mounted on a flexible wiring substrate 12, together with an electronic component 13. One end of the flexible wiring substrate 12 is fixed to the liquid crystal display panel 1. The light source element 7 and the electronic component 13 are attached to the frame 11 in such a way that the light source element 7 and the electronic component 13 are placed in housing concave portions 14 and 15 formed on the back surface side of the frame 11, respectively, by bending the flexible wiring substrate 12. A case 19 is attached to the flexible wiring substrate 12 to cover the electronic component 13. Then, the case 19 is fixed to the inside of the housing concave portion 15.

The basic configuration of the liquid crystal display devices according to the present embodiment shown in FIGS. 5 to 9B is the same as the conventional liquid crystal display device shown in FIGS. 1A to 2B. Thus, the same components are designated by the same reference numerals, and the redundant description of the parts and functions that have been described will be omitted.

The liquid crystal display device according to the present embodiment, as will be described in detail below, has a major feature in the attachment configuration of the electronic component 13 mounted on the flexible wiring substrate 12.

Note that in the present embodiment, similar to the conventional example, the light emitting diode 7 is used as the light source element. However, the present invention is not limited to this example and can use various light source elements for the light source.

Figure 6A:
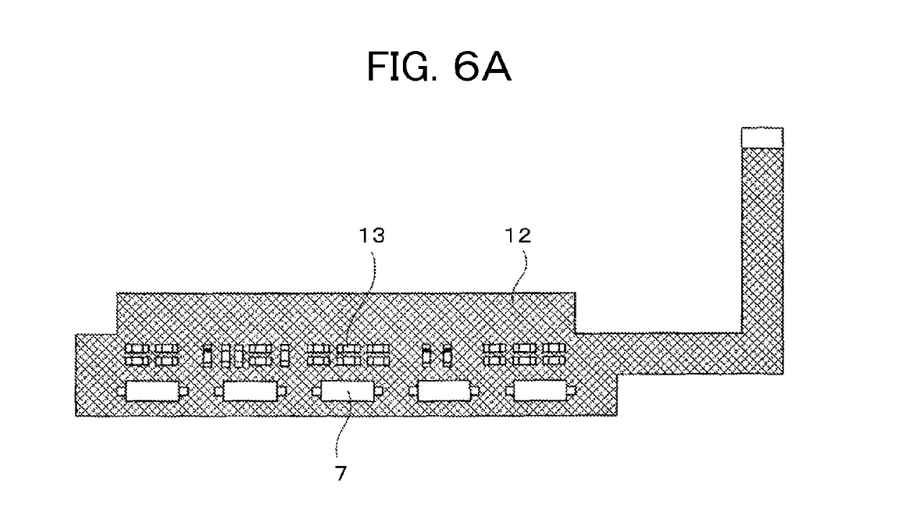
FIG. 6A is a plan view of a conventional example and FIG. 6B is a plan view of an embodiment of the present invention.

In the convention liquid crystal display device, the light emitting diode 7 and the electronic component 13 are exposed on the flexible wiring substrate 12 as shown in FIG. 6A. However, the liquid crystal display device according to the present invention is designed to cover the electronic component 13 mounted on the flexible wiring substrate 12 by the case 19 as shown in FIG. 6B.

Figure 6B:
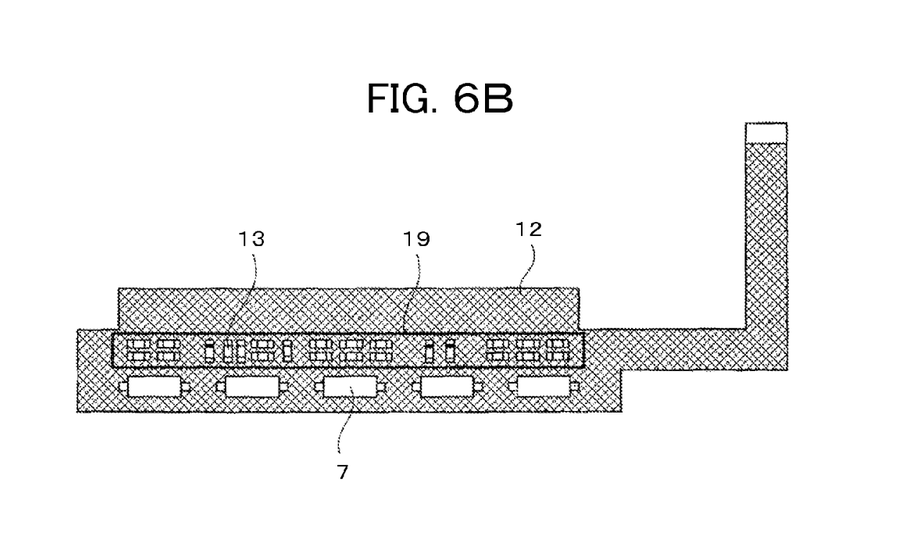

Note that in FIG. 6B, the case 19 is shown in a transparent manner to show the positional relationship with the electronic component 13.

As shown in FIG. 5, the case 19 has a box shape with one side open, covering the electronic component 13 on the flexible wiring substrate 12. The case 19 is fixed to the flexible wiring substrate 12 by an adhesive or soldering method.

The case 19 is formed, for example, by a metal or resin and has relatively high rigidity. In particular, the case 19 is preferably an electromagnetic shielding case formed by a material having an electromagnetic shielding property.

The second housing concave portion 15 of the frame 11 has approximately the same size as the case 19. As shown in FIG. 5, in the liquid crystal display device that is assembled by bending the flexible wiring substrate 12, the case 19 is placed in the second housing concave portion 15, and the top surface of the case 19 and the bottom surface of the second housing concave portion 15 are fixed by an adhesive layer 20 such as double-sided tape.

Note that the frame 11 can be formed by molding a material such as metal and resin. The first and second housing concave portions 14 and 15 can also be formed at the time of the molding.

The liquid crystal display device according to the present embodiment is assembled by bending the flexible wiring substrate 12, in which the light emitting diode 7 is placed in the first housing concave portion 14 and the electronic component 13, which is housed in the case 19, is placed in the second housing concave portion 15. Then, in the assembling state, the light emitting diode 7 is fixed to the inner surface of the first housing concave portion 14 by the adhesive layer 16, and the case 19 attached to the flexible wiring substrate 12 is fixed to the inner surface of the second housing concave portion 15 by the adhesive layer 20. With this configuration, the flexible wiring substrate 12 is tightly fixed to the frame 11.

Thus, it is possible to prevent the flexible wiring substrate 12 from being floated by the repulsive force due to the bending of the flexible wiring substrate 12. As a result, it is possible to stably hold the light emitting diode 7 facing the end portion of the light guide panel 8. In other words, the optical axis of the light emitting diode 7 that emits light to the light guide plate 8 prevents displacement to achieve a liquid crystal display device with the full flat back configuration in order to obtain brightness as designed.

Note that even in an aspect of not providing the adhesive layer 16 for fixing the light emitting diode 7 due to the design requirements or other reasons, the same operation effect as described above can be obtained by the adhesive layer 20 for fixing the case 19.

Further, Electro Magnetic Interference (EMI) can cause malfunction of the liquid crystal display device and the actual device on which the liquid crystal display device is mounted. However, when an electronic shielding case is used for the case 19, it is possible to block EMI generated by the electronic component 13, and to prevent such a malfunction.

FIGS. 7A to 9B show the assembly process of the liquid crystal display device according to the present embodiment.

Figure 7A:
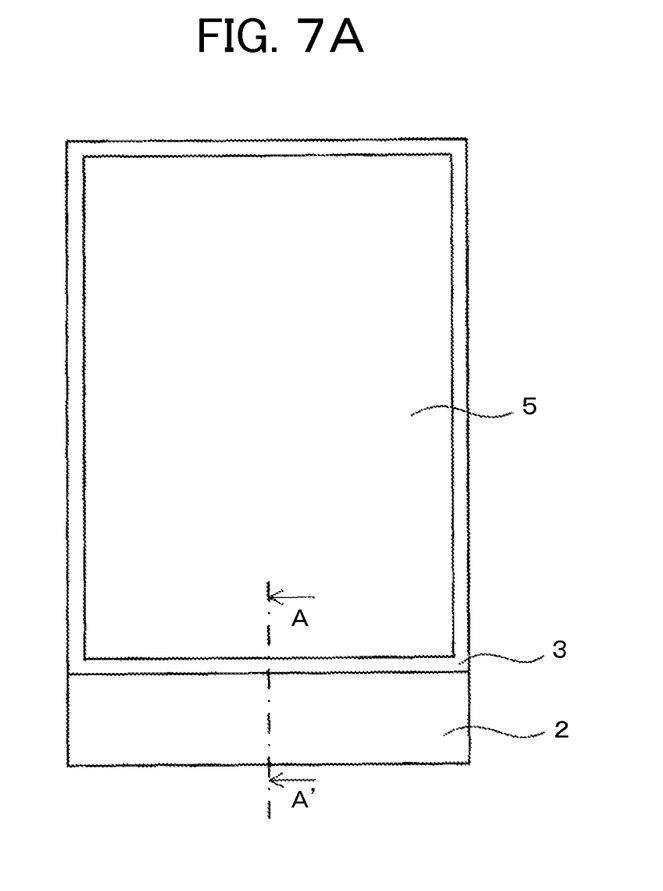
FIG. 7A is a plan view and FIG. 7B is a cross-sectional view taken along line A-A' of FIG. 7A.
Figure 7B:
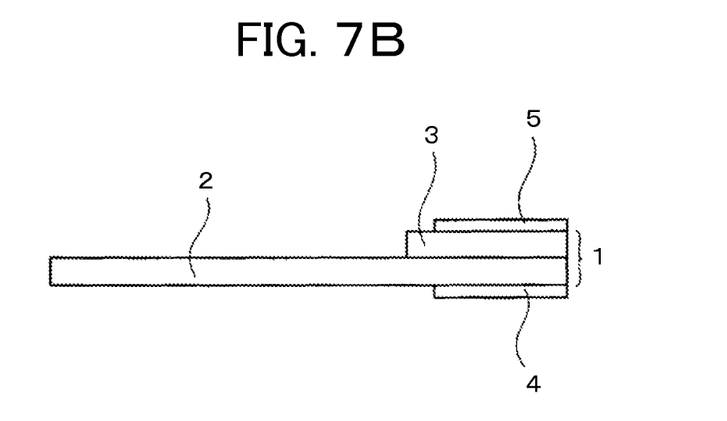

First, as shown in FIGS. 7A and 7B, a liquid crystal display panel 1 is formed by bonding a transparent substrate 2 in which thin film transistors and the like are arranged, and a transparent substrate 3 in which color filters are arranged. The space between the transparent substrates 2 and 3 is filled with liquid crystal. Then, a lower polarizing plate 4 and an upper polarizing plate 5 are attached to the back and top surfaces of the liquid crystal display panel 1, respectively.

Figure 8A:
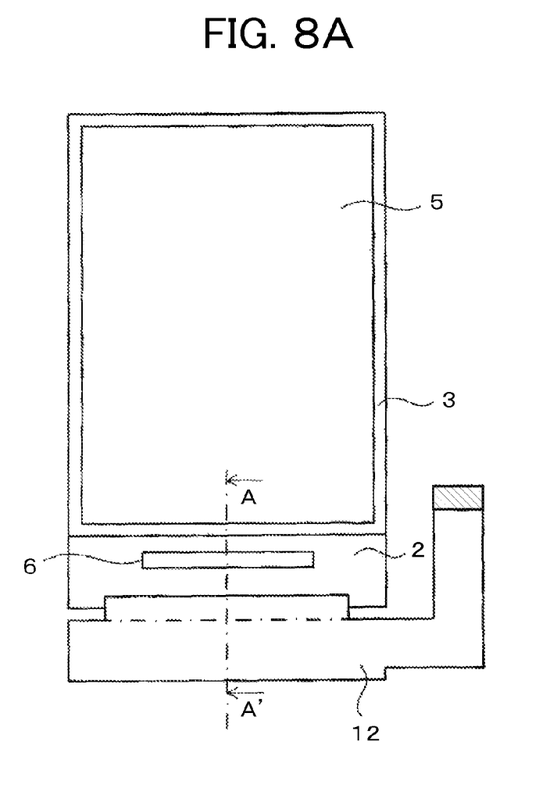
FIG. 8A is a plan view and FIG. 8B is a cross-sectional view taken along line A-A' of FIG. 8A.
Figure 8B:
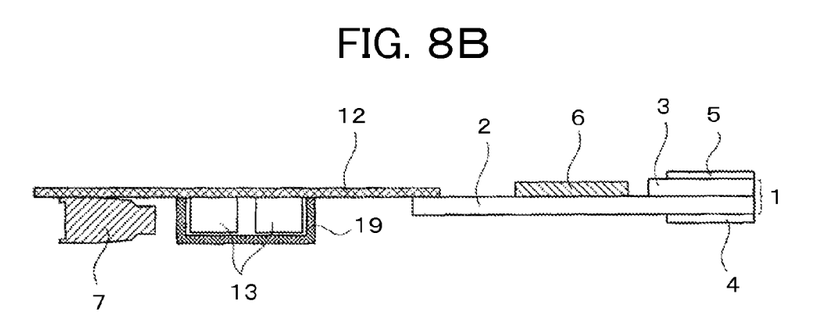

Next, as shown in FIGS. 8A and 8B, a driver 6 is provided in the transparent substrate 2. Further, the flexible wiring substrate 12 on which the light emitting diode 7 and the electronic component 13 covered by the case 19 are mounted is fixedly attached to the transparent substrate 2 in one end portion thereof.

Figure 9A:
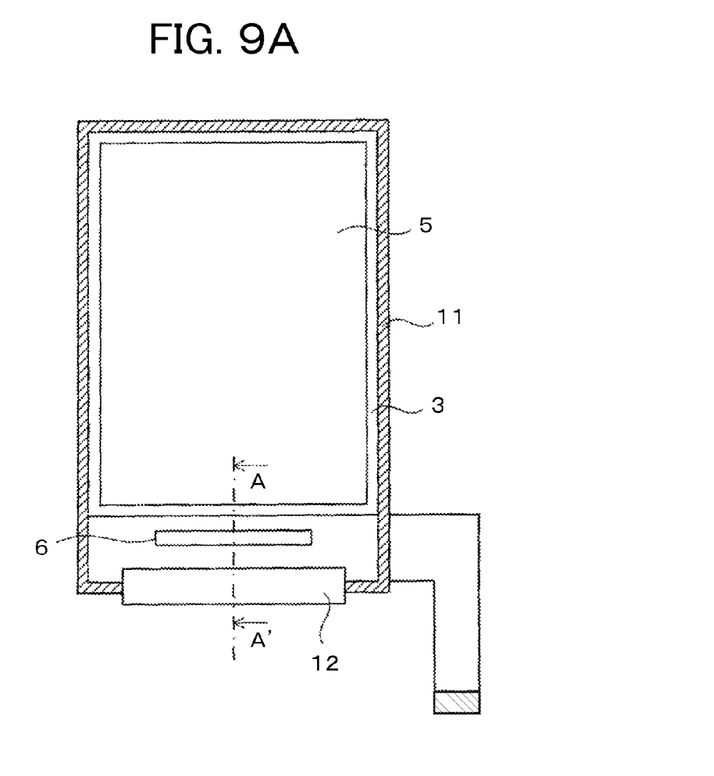
FIG. 9A is a plan view and FIG. 9B is a cross-sectional view taken along line A-A' of FIG. 9A.
Figure 9B:
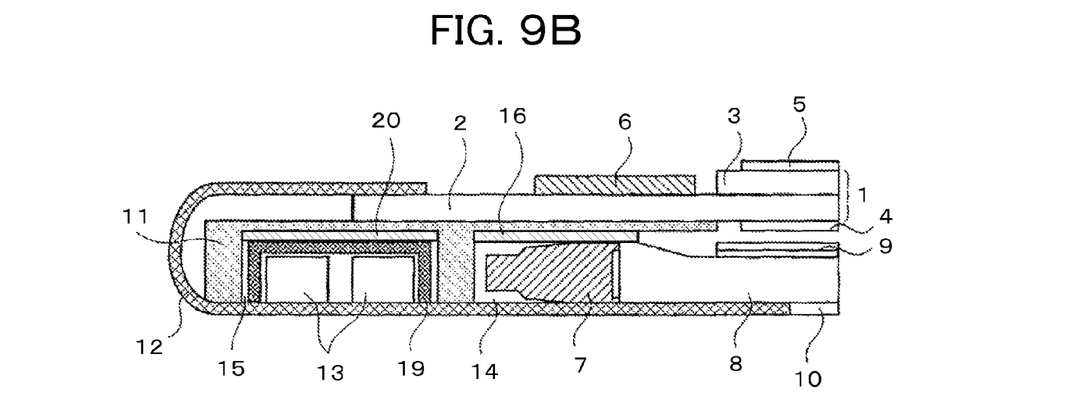

Next, as shown in FIGS. 9A and 9B, the liquid crystal display panel 1 is placed on the frame 11, and the flexible wiring substrate 12 is bent over one side portion of the frame 11, in which the light emitting diode 7 is placed in the first housing concave portion 14 and the electronic component 13, which is covered by the case 19, is placed in the second housing concave portion 15.

The adhesive layers 16 and 20 are provided in the first and second housing concave portions 14 and 15 that are formed in the frame 11. The liquid crystal display device is assembled in such a way that the light emitting diode 7 and the case 19, which are placed in the first and second housing concave portions 14 and 15, are fixedly attached to the inside of the first and second housing concave portions 14 and 15 by the adhesive layers 16 and 20, respectively.

Note that the adhesive layers 16 and 20 can also be provided in the light emitting diode 7 and the case 19, respectively. In this case, the light emitting diode 7 and the case 19 are placed in the first and second housing concave portions 14 and 15, respectively, and fixedly attached to the inside of the first and second housing concave portions 14 and 15 by the adhesive layers 16 and 20, respectively.

Further, the case 19 can be fixed to the second housing concave portion 15 in any part thereof. In particular, when the top surface of the case 19 is bonded to the bottom surface of the second housing concave portion 15 as shown in the present embodiment, the case 19 can be smoothly inserted into the housing concave portion 15 without touching the adhesive layer.

Here, in the assembly operation, when the case 19 is placed in the second housing concave portion 15, the case 19 is guided with the outer surface of the case 19 coming into contact with the inner surface of the second housing concave portion 15. Thus, it is possible to attach the light emitting diode 7 to the light guide plate 8 by accurately determining the position of the light emitting diode 7 with respect to the light guide plate 8 based on the case 19.

In the present embodiment, the size of the case 19 is approximately the same as the second housing concave portion 15, so that the case 19 is guided back and forth and left and right. In this way, the positioning action can be sufficiently achieved. Note that the positioning action can be achieved as long as any portion of the case 19 comes into contact with the inner surface of the housing concave portion 15. Thus, in the present invention, the shape and size of the case 19 is not limited to the exemplary embodiment.

It should be understood that the present invention is not limited to the above exemplary embodiment and various changes and modifications can be made therein without departing from the scope of the present invention.

For example, in the above embodiment, the housing concave portions 14 and 15 for housing the light emitting diodes 7 and the case 19 are separated by a partition. However, in the present invention, it is possible to eliminate the partition to integrate the housing concave portions 14 and 15 into one housing concave portion.

The present invention can be widely applied to a liquid crystal display device in which a light source element and an electronic component are mounted on a flexible wiring substrate fixed to a liquid crystal panel in one end portion thereof. The light source element and the electronic component are attached to a frame in such a way that each of the light source element and the electronic component is placed in a housing concave portion formed on the back surface side of the frame, by bending the flexible wiring substrate. For example, the present invention can be used as a display device for portable information devices such as mobile phones, personal digital assistants (PDA), digital cameras, and multimedia players.

What is claimed is:

1. A liquid crystal display device comprising:
a liquid crystal display panel; and
a backlight unit provided on a back surface of the liquid crystal display panel,
wherein the backlight unit includes:
a light source element;
a light guide plate for guiding output light from the light source element; and
a frame for housing the light guide plate,
wherein the light source element is mounted on a flexible wiring substrate fixed to the liquid crystal panel at an end thereof, together with an electronic component,
wherein the light source element and the electronic component are attached to the frame in such a way that each of the light source element and the electronic component is placed in a housing concave portion formed on the back surface side of the frame, by bending the flexible wiring substrate,
wherein a case is fixedly attached to the flexible wiring substrate to cover the electronic component, and
wherein the case is fixed to the inside of the housing concave portion.

2. The liquid crystal display device according to claim 1, wherein the case is an electromagnetic shielding case.

* * * * *